United States Patent
Heo et al.

(10) Patent No.: US 10,570,223 B2
(45) Date of Patent: Feb. 25, 2020

(54) STRIPPING APPARATUS

(71) Applicant: LG CHEM, LTD., Seoul (KR)

(72) Inventors: Chang Hoe Heo, Daejeon (KR); Eun Jung Joo, Daejeon (KR); Dae Young Shin, Daejeon (KR); Joon Ho Shin, Daejeon (KR)

(73) Assignee: LG Chem, Ltd., Seoul (KR)

(*) Notice: Subject to any disclaimer, the term of this patent is extended or adjusted under 35 U.S.C. 154(b) by 431 days.

(21) Appl. No.: 15/313,890

(22) PCT Filed: May 28, 2015

(86) PCT No.: PCT/KR2015/005347
§ 371 (c)(1),
(2) Date: Nov. 23, 2016

(87) PCT Pub. No.: WO2015/183006
PCT Pub. Date: Dec. 3, 2015

(65) Prior Publication Data
US 2017/0190808 A1    Jul. 6, 2017

(30) Foreign Application Priority Data

May 28, 2014  (KR) .......... 10-2014-0064219
May 28, 2015  (KR) .......... 10-2015-0074696

(51) Int. Cl.
*C08F 6/00* (2006.01)
*B01D 1/12* (2006.01)

(52) U.S. Cl.
CPC .......... *C08F 6/003* (2013.01); *B01D 1/12* (2013.01); *C08F 6/00* (2013.01)

(58) Field of Classification Search
CPC .......... C08F 6/003; C08F 6/00; B01D 1/12
USPC .......... 524/804
See application file for complete search history.

(56) References Cited

U.S. PATENT DOCUMENTS 4,483,747 A    11/1984   Aruga et al.
5,804,039 A    9/1998    Kurazono et al.

FOREIGN PATENT DOCUMENTS

| CN | 1112938 A | 12/1995 | |
| CN | 2688709 Y | 3/2005 | |
| CN | 201419034 Y | 3/2010 | |
| EP | 1097947 A1 | 5/2001 | |
| JP | 11100410 A | 4/1999 | |
| JP | 2000-212214 A | 8/2000 | |
| JP | 2003137924 A | 5/2003 | |
| JP | 2004189927 A | 7/2004 | |
| JP | 2005105047 A | 4/2005 | |
| KR | 100429272 B1 * | 4/2004 | ............ B01D 3/14 |
| KR | 100429272 B1 | 4/2004 | |
| WO | 00/064950 A1 | 11/2000 | |

OTHER PUBLICATIONS

Office Action of Japanese Patent Office in Appl'n. No. 2016-568846, dated Jun. 5, 2018.

* cited by examiner

*Primary Examiner* — Kelechi C Egwim
(74) *Attorney, Agent, or Firm* — Dentons US LLP

(57) ABSTRACT

The present application relates to a method for removing an unreacted vinyl chloride monomer (VCM) in polyvinyl chloride (PVC). According to an illustrative stripping apparatus and a stripping method using the stripping apparatus of the present application, in a stripping process using steam, a temperature difference between a raw material including a target substance to be removed and steam is minimized to suppress foam generation in the stripping process, thereby increasing efficiency of removing the target substance to be removed, particularly, an unreacted VCM in PVC. In addition, a cleansing cycle to remove foams generated in the stripping apparatus can be reduced, thereby not only securing economic feasibility of the process, but also preventing degradation in quality of a final product that may occur when an antifoamer to remove the foams is used.

8 Claims, 2 Drawing Sheets

[FIG 1]
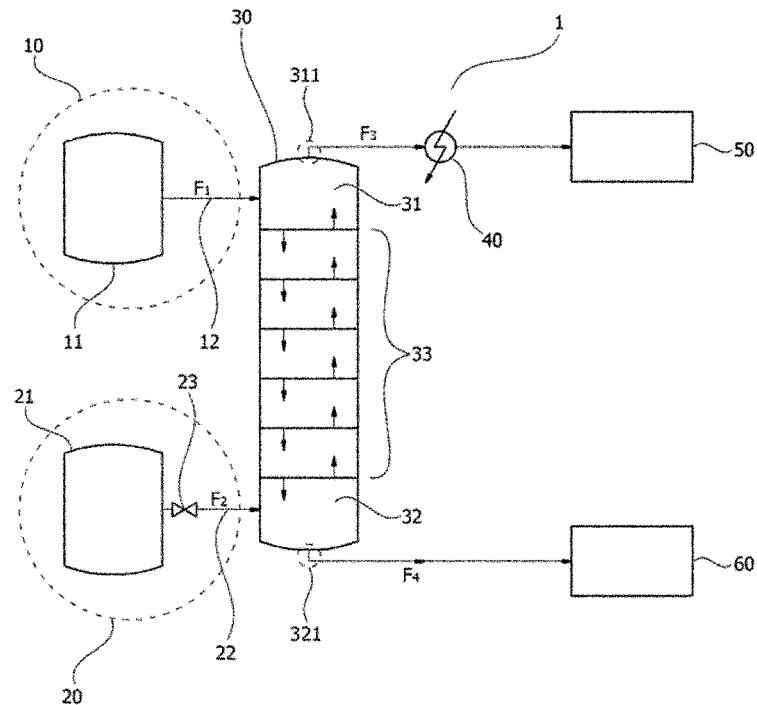
[FIG 2]
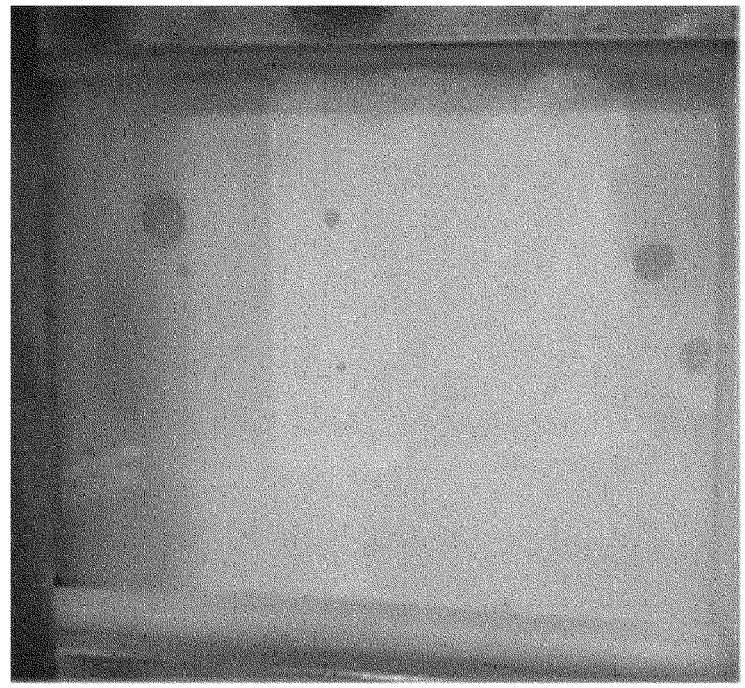

【FIG 3】
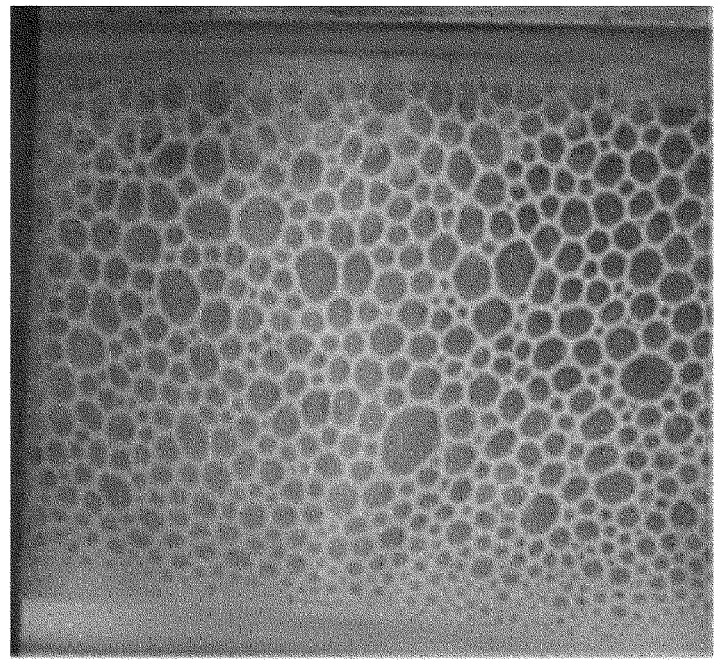
【FIG 4】
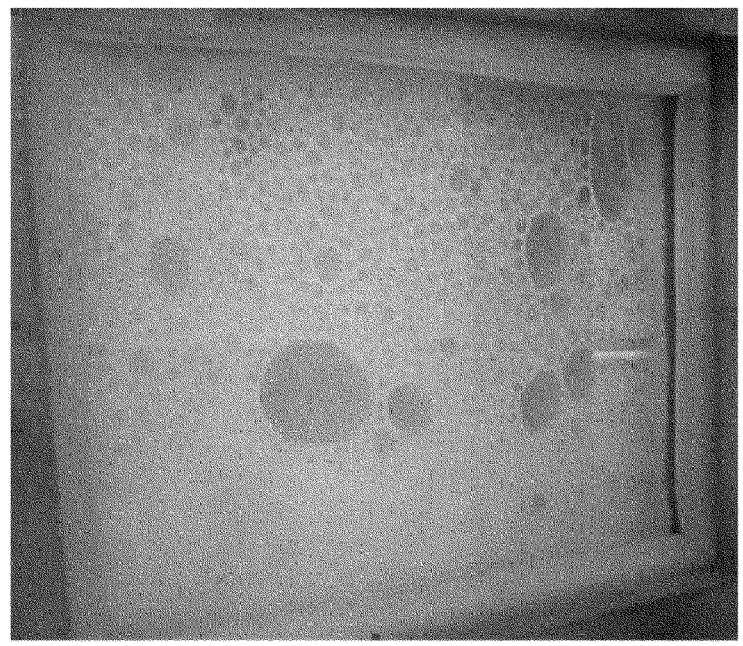

STRIPPING APPARATUS

This application is a National Stage Application of International Application No. PCT/KR2015/005347, filed May 28, 2015, and claims the benefit of Korean Patent Application No. 10-2014-0064219, filed May 28, 2014, and Korean Patent Application No. 10-2015-0074696, filed May 28, 2015, the contents of which are incorporated herein by reference in their entirety for all purposed as if fully set forth below.

TECHNICAL FIELD

Embodiments of the present application relate to a stripping apparatus and a method for removing an unreacted vinyl chloride monomer (VCM) in polyvinyl chloride (PVC) using the same.

BACKGROUND ART

Polyvinyl chloride (PVC) is a synthetic resin of a thermoplastic resin which is usefully employed in various fields. For example, as a soft product, PVC is used in fields such as packaging films, patterned sheets of surfaces of electronic products and various types of furniture, and the like, and as a hard product, PVC is used in manufacturing a water pipe by extrusion molding.

Generally, a vinyl chloride monomer (VCM), which is a raw material used in manufacturing the PVC, is polymerized in a batch reactor, wherein an organic peroxide, or the like, which is an explosive substance, is used as a reaction initiator, and a dispersant or an emulsifier and an antioxidant, etc. are used as an additive. In addition, the polymerized PVC is stored in a powder form after an unreacted residual VCM in the PVC is removed through a stripping process.

DISCLOSURE

Technical Problem

The present application is directed to providing a stripping apparatus, and a method for removing an unreacted vinyl chloride monomer in polyvinyl chloride using the same.

Technical Solution

The present application relates to a stripping apparatus. According to an illustrative stripping apparatus and a method for removing an unreacted vinyl chloride monomer (VCM) in polyvinyl chloride (PVC) using the stripping apparatus of the present application, in a stripping process using steam, a temperature difference between a raw material including a target substance to be removed and steam is minimized to suppress foam generation in the stripping process, thereby increasing efficiency in removing the target substance to be removed, particularly, an unreacted VCM in PVC. In addition, a cleansing cycle to remove foams generated in the stripping apparatus can be reduced, thereby not only securing economic feasibility of the process, but also preventing degradation in quality of a final product that may occur when an antifoamer to remove the foams is used. In the present specification, the term "stripping" refer to separating and removing a gas dissolved in a liquid, and, for example, can be performed by methods such as direct contact, heating, pressing, and the like by steam, an inert gas, air, or the like. In the present specification, the term "stripping" may have the same meaning as diffusing or separating.

Hereinafter, the stripping apparatus, and the method for manufacturing and stripping PVC using the stripping apparatus will be described with reference to the accompanying drawings, but the drawings are only for illustrative purposes, and thus the scope of the stripping apparatus is not limited to the drawings.

FIG. 1 is a view schematically illustrating a stripping apparatus according to an illustrative embodiment of the present application. As shown in FIG. 1, a stripping apparatus 1 of the present application may include a raw material supply device 10, a steam supply device 20, and a stripping column 30.

The raw material supply device 10 is a device to supply a raw material $F_1$ to the stripping column 30, e.g. a raw material supply region 31 of the stripping column 30, and may include a tank in which the raw material $F_1$ is stored or a reactor 11 in which the raw material $F_1$ is polymerized, and a pipe 12 through which the raw material $F_1$ is transported. In one example, the raw material supply device 10 may include the reactor 11 in which the raw material $F_1$ is polymerized, and for example, a batch reactor, a flow reactor, and the like may be used as the reactor 11, but embodiments of the present application are not limited thereto and a type of the reactor 11 may be properly selected in accordance with a type and reaction conditions of the of a target substance.

In one example, the raw material $F_1$ may include a product prepared after the polymerization reaction in the reactor 11. The polymerization reaction may be performed by various methods in accordance with a type of a target substance. For example, when the raw material $F_1$ includes PVC, the polymerization reaction can be performed by methods such as suspension polymerization, emulsion polymerization, bulk polymerization, and the like, but embodiments of the present application are not limited thereto. For example, when polymerizing the PVC by the suspension polymerization, the polymerization may be performed under proper temperature and pressure conditions after putting a VCM, water, a dispersant, and a reaction initiator into the batch reactor 11. When polymerizing the PVC by the emulsion polymerization, the polymerization may be performed under proper temperature and pressure conditions after putting the VCM, water, an emulsifier, and the reaction initiator. Various substances known in the art may be used as the dispersant, the emulsifier, and the reaction initiator, and embodiments of the present application are not particularly limited.

In an embodiment of the present application, the raw material may include an emulsion polymerization product of a monomer. In one example, the monomer may be a VCM. For example, in the reactor 11, emulsion polymerization may be performed under proper temperature and pressure conditions after proper amounts of the VCM, water, an emulsifier, and a reaction initiator are putted, and a resulting reactant may be introduced into the raw material supply region 31 through the raw material supply device 10 and stripped. A ratio between water and the VCM in the reactor 11 is not particularly limited, and the concentration of the emulsifier may be 2,000 to 10,000 ppm, and the concentration of the reaction initiator may be, for example, 500 to 1,000 ppm, but embodiments of the present application are not limited thereto. When the raw material $F_1$ including an emulsion polymerization product of a monomer is stripped by the stripping apparatus 1 of the present application, monomers surrounded by the emulsifier come out of the emulsifier, thereby generating a relatively small number of foams compared with when stripping is performed using a conventional stripping apparatus. As an example of the emulsion polymerization product, PVC, styrene-butadiene rubber (SBR), and the like may be exemplified, but embodiments of the present application are not limited thereto.

In addition, although not shown, when, for example, the raw material supply device 10 includes the reactor 11, the raw material supply device 10 may further include a pipe to introduce the reactant mentioned above into the reactor 11, and a reactant supply device connected to the reactor 11 by the pipe.

The raw material $F_1$ including the product polymerized in the reactor 11 may include PVC and an unreacted residual VCM. For example, when the polymerization process performed in the reactor 11 is suspension polymerization or bulk polymerization, the raw material $F_1$ may exist in a phase of slurry in which water, PVC, and an unreacted residual VCM are mixed, and when the polymerization process performed in the reactor 11 is emulsion polymerization, the raw material $F_1$ may exist in a state in which a polymer molecule is dissolved in water by the emulsifier (hereinafter, a phase of latex). When a conversion ratio in the reactor 11 reaches a predetermined level, e.g. a level equal to or greater than 80%, a part of the raw material $F_1$ in the phase of slurry or latex may be introduced in to a blow-down tank (not shown) such that the unreacted residual VCM may be recovered in the blow-down tank, and a remainder of the raw material $F_1$ may be introduced into the stripping apparatus 1 of the present application and stripped. In one example, when the raw material $F_1$ is in the phase of slurry, the slurry from which the unreacted residual VCM is removed in the blow-down tank and the stripping apparatus 1 may have moisture separated from PVC through a centrifuge, residual moisture of the transported PVC resin may be dried by hot air using a fluidized bed dryer, and the PVC may be stored in a separate storage tank 60 in a powder form after passing through a selecting facility. In another example, when the raw material $F_1$ is in the phase of latex, the latex from which the unreacted residual VCM is removed in the blow-down tank and the stripping apparatus 1 may be dried by hot air using a fluidized bed dryer, or sprayed and have moisture removed therefrom using hot air without passing through a centrifuge, such that PVC may be stored in the separate storage tank 60 in a powder form after passing through a selecting facility.

The stripping column 30 is a stripping column to separate a substance to be separated from a gas in the raw material $F_1$ and the raw material $F_1$ introduced from the raw material supply device 10, e.g. an unreacted residual VCM, from the raw material $F_1$. The stripping column 30 is divided into the raw material supply region 31; a steam supply region 32; and a stripping region 33 between the raw material supply region 31 and the steam supply region 32. In other words, the raw material $F_1$ in the phase of slurry may be introduced from the raw material supply device 10 to the raw material supply region 31 of the stripping column 30, the raw material $F_1$ may come in contact with steam $F_2$ introduced from the steam supply region 32 of the stripping column 30 through the stripping region 33, and may be heated to be stripped. For example, when the raw material $F_1$ includes PVC and an unreacted residual VCM, a substance stripped from the raw material $F_1$ may be an unreacted VCM.

In one example, the steam supply region 32 may include a first outlet 321, and a first outflow $F_4$, which is the stripped raw material, e.g. a raw material in a phase of slurry that includes PVC from which an unreacted residual VCM is removed, may flow out through the first outlet 321. In the above, as shown in FIG. 1, the first outlet 321 may be positioned below the steam supply region 32 and/or a bottom portion of the stripping column 30, but embodiments of the present application are not limited thereto. In addition, the raw material supply region 31 may include a second outlet 311, and a second outflow $F_3$ that includes a substance stripped from the raw material, e.g. an unreacted residual VCM and steam $F_2$ that has come in contact with the raw material, may flow out through the second outlet 311. As shown in FIG. 1, the second outlet 311 may be positioned above the raw material supply region 31 and/or a top portion of the stripping column 30, but embodiments of the present invention are not limited thereto. In the present specification, the term "above" may refer to a region relatively above the steam supply region 32 and the raw material supply region 31, and more specifically, to the top region of two divided regions when the steam supply region 32 and the raw material supply region 31 are halved in a horizontal direction, e.g. a direction perpendicular to a lengthwise ore height direction of the stripping column. In addition, in the present specification, the term "below" may refer to a region relatively below the steam supply region 32 and the raw material supply region 31, and more specifically, to the bottom region of the two divided regions when the steam supply region 32 and the raw material supply region 31 are halved in the horizontal direction, e.g. a direction perpendicular to the lengthwise or height direction of the stripping column. In addition, the expression "top portion" of the stripping column 30 may refer to the highest portion of the stripping column 30 and may be positioned above the raw material supply region 31 mentioned above, and the expression "bottom portion" of the stripping column 30 may refer to the lowest portion of the stripping column 30 and may be positioned below the steam supply region 32 mentioned above.

The steam supply device 20 is a device to perform a process of stripping the introduced raw material in the phase of slurry in the stripping region 33 of the stripping apparatus 1 of the present application, i.e. to introduce steam $F_2$ which comes in direct contact with the raw material into the stripping apparatus 1, and any device known in the art that can supply steam $F_2$ may be used as the steam supply device 20 without particular limitation. In addition, the steam supply device 20 may include a tank in which steam $F_2$ is stored or a steam generator 21 to generate the steam $F_2$, and a pipe 22 connected between the tank or the steam generator 21 and the steam supply region 32. For example, the steam $F_2$ introduced into the steam supply region 32 inside the stripping column 30 through the steam supply device 20 may be introduced into the stripping region 33 and come in contact with the raw material introduced from the raw material supply region 31 in the stripping region 33, thereby stripping the raw material $F_1$.

In one example, the stripping apparatus 1 of the present application satisfies Equation 1 below.

$$5° C. \leq T_s - T_f < 30° C. \qquad \text{[Equation 1]}$$

In Equation 1, $T_s$ represents a temperature of the steam $F_2$ introduced into the stripping column 30, and $T_f$ represents a temperature of the raw material $F_1$ introduced into the stripping column 30.

In the stripping apparatus 1 of the present application, as mentioned above, a temperature difference between a raw material $F_1$ including a target substance to be removed, e.g. an unreacted VCM, and steam $F_2$ introduced into the stripping apparatus 1 may be adjusted to be equal to or greater than 5° C. and less than 30° C., e.g. to be equal to or greater than 10° C. and less than 30° C. and to be equal to or greater than 20° C. and less than 30° C., thereby suppressing foam generation in the stripping process and causing sufficient heat exchange between the steam $F_2$ and the raw material $F_1$, such that efficiency of removing the target substance to be removed, particularly the unreacted VCM in PVC, can be increased. In addition, a cleansing cycle to remove foams generated in the stripping apparatus 1 can be reduced, thereby not only securing economic feasibility of the process, but also preventing degradation in quality of a final product that may occur when using an antifoamer to remove the foams.

In the above, the temperature of the raw material $F_1$ is not particularly limited if Equation 1 is satisfied, but may be adjusted to be in a range of 50 to 75° C., e.g. in ranges of 60 to 70° C. and 55 to 65° C.

In addition, the temperature of the steam $F_2$ is not particularly limited if Equation 1 is satisfied, but may be adjusted to be in a range of 55 to 105° C., e.g. in ranges of 60 to 100° C. and 70 to 90° C.

The steam $F_2$ introduced into the steam supply region 32 inside the stripping column 30 through the steam supply device 20 may be introduced in an amount that is large enough to strip the raw material $F_1$. For example, the steam $F_2$ may be introduced in an amount that is less than 15% of a feed rate of the raw material $F_1$ introduced into the raw material supply region 31, and preferably, in an amount of 1 to 10%, 1 to 5%, or 2 to 4% of the feed rate of the raw material. By adjusting a feed rate of the steam $F_2$ to be within the range mentioned above, the raw material $F_1$ may be sufficiently stripped and foam generation in the stripping process may be suppressed at the same time.

To satisfy Equation 1 or to be adjusted to be in the temperature range mentioned above, the steam $F_2$ may be introduced into the steam supply region 32 under an appropriate range of pressure.

For example, pressure of the steam $F_2$ introduced into the steam supply region 32 may 1.0 bar or less, e.g. 0.8 bar or less, 0.6 bar or less, 0.4 bar or less, 0.3 bar or less, or 0.1 bar or less, and preferably, the steam $F_2$ may be introduced in a vacuum state.

To be introduced in the pressure range above, the steam $F_2$ may be decompressed before being introduced into the steam supply region 32. For example, the steam supply device 20 may further include a decompression device 23, and low-pressure steam having pressure of 2.5 to 5.0 bar, e.g. 2.8 to 3.2 bar, may pass through the decompression device 23 and be decompressed and introduced into the steam supply region 32.

As the decompression device 23, various devices capable of lowering pressure of the steam $F_2$ known in the art may be used. For example, when the steam supply device 20 includes the pipe 22, pressure may be adjusted using a control valve, and the like, installed at the pipe 22.

In one embodiment, although not shown, the steam supply device 20 may further include a cooling device. To satisfy Equation 1 or to be adjusted within the temperature range mentioned above, the low-pressure steam may be introduced into the steam supply region 32 after passing through the cooling device and being cooled.

In another embodiment of the present application, the stripping apparatus 1 may further include a recovering device 50 to recover and reuse the unreacted VCM mentioned above. For example, the stripping apparatus 1 may further include a condenser 40 and the recovering device 50 for a stripped substance which are sequentially connected to the second outlet 311 included in the raw material supply region 31 mentioned above. The unreacted residual VCM which passes through the condenser 40 and the recovering device 50 and is recovered may be introduced to the raw material supply device 10 mentioned above to be reused. Since the recovered VCM can be reused in a polymerization process of PVC by the recovering device 50, economic feasibility of a process of manufacturing PVC can be secured.

For example, as mentioned above, the second outflow $F_3$ including an unreacted residual VCM and steam $F_2$ which has come in contact with the raw material $F_1$ may flow out through the second outlet 311, the steam may pass through the condenser 40, and steam which comes in contact with a condensate in the condenser 40 and is condensed may be separated and discharged. The flow amount of the condensate passing through the condenser 40 is not particularly limited, and may be properly adjusted in accordance with a flow amount of the second outflow $F_3$. In addition, the non-condensed stripped substance, e.g. the unreacted residual VCM, may flow out in a gaseous state, be compressed in a continuous recovery compressor, and be condensed.

The stripping apparatus 1 may be a common distillation column or a stripping column in other forms such as an evaporator.

In one example, when the stripping apparatus 1 is a common distillation column, a part of fed steam $F_2$ may flow out in a gaseous state from an upper portion of the distillation column if a state of equilibrium is reached. In this case, as mentioned above, the second outflow $F_3$ including the steam may flow out through the second outlet 311, the steam may pass through the condenser 40, and the steam which comes in contact with the condensate in the condenser 40 and is condensed may be separated and discharged. In addition, for example, when the stripping apparatus 1 is a stripping column in a form of an evaporator, the whole fed steam $F_2$ may be condensed in the column and drop to the bottom of the column, but embodiments of the present application are not limited thereto. For example, a part of condensed steam may drop to the bottom of the column or a part of non-condensed steam may be discharged from the top of the column even when the stripping apparatus 1 is a common distillation column, and a part of the condensed steam may drop to the bottom of the column, or a part of the non-condensed steam may be discharged from the top of the column even when the stripping apparatus 1 is a stripping column.

The present application also provides a method for removing an unreacted monomer. In one example, a removal method of the present application may be performed using the stripping apparatus 1 mentioned above.

The removal method includes introducing a raw material $F_1$ including an emulsion polymerization product of a monomer into a raw material supply region 31 of a stripping column 30 included in the stripping apparatus 1 mentioned above, and bringing the introduced raw material $F_1$ into contact with steam $F_2$ introduced into a steam supply region 32 of the stripping column 30 to separate an unreacted monomer from the raw material $F_1$.

In one example, as mentioned above, the monomer may be a vinyl chloride monomer. In this case, in the removal method of the present application, the raw material $F_1$ may include PVC and an unreacted VCM, and the raw material $F_1$ introduced into the raw material supply region 31 may be brought into contact with the steam $F_2$ introduced into the steam supply region 32 to separate an unreacted VCM from the raw material $F_1$.

In addition, the removal method may include adjusting temperatures of the raw material $F_1$ and the steam $F_2$ introduced into the stripping column 30 to satisfy Equation 1 below.

$$5°\,C. \leq T_s - T_f < 30°\,C. \qquad \text{[Equation 1]}$$

In Equation 1, $T_s$ represents a temperature of the steam $F_2$ introduced into the stripping column 30, and $T_f$ represents a temperature of the raw material $F_1$ introduced into the stripping column 30.

In the removal method, the temperature of the raw material $F_1$ is not particularly limited if Equation 1 is satisfied, but may be adjusted to be in a range of 50 to 75° C., e.g. in ranges of 60 to 70° C. and 55 to 65° C.

In addition, in the removal method, the temperature of the steam $F_2$ is not particularly limited if Equation 1 is satisfied, but may be adjusted to be in a range of 55 to 105° C., e.g. in ranges of 60 to 100° C. and 70 to 90° C.

In addition, in the removal method, the steam $F_2$ introduced into the steam supply region 32 inside the stripping column 30 through the steam supply device 20 may be introduced in an amount that is large enough to strip the raw material $F_1$. For example, the steam $F_2$ may be introduced in an amount that is equal to or less than 15% of a feed rate of the raw material $F_1$ introduced into the raw material supply region 31, and preferably, in an amount of 1 to 10%, 1 to 5%, or 2 to 4% of the feed rate of the raw material.

In addition, as mentioned above, to satisfy Equation 1 or to be adjusted to be in the temperature range mentioned above, the steam $F_2$ may be introduced into the steam supply region 32 under pressure in a proper range. For example, the removal method may further include adjusting the pressure of the steam $F_2$ to 1.0 bar or less, e.g. 0.8 bar or less, 0.6 bar or less, 0.4 bar or less, 0.3 bar or less, or 0.1 bar or less.

In addition, the removal method may further include a step of decompressing the steam $F_2$ before the steam $F_2$ is introduced into the steam supply region 32 to enable the steam $F_2$ to be introduced within the pressure range. For example, the removal method may further include decompressing low-pressure steam having pressure of 2.5 to 5.0 bar, and introducing the decompressed low-pressure steam $F_2$ into the steam supply region 32 of the stripping column 30.

In addition, as mentioned above, the removal method may further include flowing out a first outflow $F_4$ including a stripped raw material through a first outlet 321 included in the steam supply region 32, and flowing out a second outflow $F_3$ including an unreacted VCM and steam separated from the raw material through a second outlet 311 included in the raw material supply region 31.

In one embodiment, the removal method may further include condensing the steam $F_2$ in the flow flowing out through the second outlet 311 to separate the steam $F_2$ from the non-condensed unreacted VCM, and recovering and reusing the unreacted VCM separated from the second outflow $F_3$ flowing out through the second outlet 311.

Advantageous Effects

According to a stripping apparatus and method of the present application, in a stripping process using steam, a temperature difference between a raw material including a target substance to be removed and steam may be minimized to suppress foam generation in the stripping process, thereby increasing efficiency of removing the target substance to be removed, particularly an unreacted vinyl chloride monomer (VCM) in polyvinyl chloride (PVC). In addition, a cleansing cycle to remove foams generated in the stripping apparatus can be reduced, thereby not only securing economic feasibility of the process, but also preventing degradation in quality of a final product that can occur when an antifoamer to remove the foams is used.

DESCRIPTION OF DRAWINGS

FIG. 1 is a view schematically illustrating an illustrative stripping apparatus of the present application.

FIG. 2 is a photograph obtained by photographing the inside of the stripping apparatus according to Example 1 of the present application.

FIGS. 3 and 4 are photographs obtained by photographing the insides of stripping apparatus according to comparative examples 1 and 2, respectively, of the present application.

MODES OF THE INVENTION

Hereinafter, the present application is described in further detail using embodiments in accordance with the present application and comparative examples not in accordance with the present application, but the scope of the present application is not limited by the embodiments described below.

EXAMPLE 1

Emulsion polymerization was performed after putting a vinyl chloride monomer (VCM) and water in a ratio of 1:1 and an emulsifier and a reaction initiator in a batch reactor in a raw material supply region of a stripping apparatus manufactured as in FIG. 1, and a raw material at a temperature of 65° C. including a polymerization product of the batch reactor was introduced into the raw material supply region of the stripping column. At the same time, steam at a temperature of 91° C. and pressure of 0.7 bar was introduced into a steam supply region of the stripping column and a stripping process was performed in a stripping region. In this case, whether a foam is generated inside the stripping apparatus was observed with the naked eye and was evaluated in accordance with criteria below, the result of which is shown in Table 1 below. In addition, a photograph of the inside of the stripping apparatus was taken and is shown in FIG. 2.

<Observation of Whether Foam is Generated>

Whether a foam is generated inside the stripping apparatus was checked with the naked eye, and was evaluated with following criteria in accordance with the number of generated foams.

X: number of foams observed with the naked eye is equal to or less than 10

Δ: number of foams observed with the naked eye is in a range of 10 to 50

O: number of foams observed with the naked eye exceeds 50

Example 2

A stripping process was performed in the same way as Example 1 except that steam at a temperature of 86° C. and pressure of 0.3 bar as introduced into the steam supply region. In this case, whether a foam is generated inside the stripping apparatus was observed, and the result of the evaluation is shown in Table 1.

Example 3

A stripping process was performed in the same way as Example 1 except that steam at a temperature of 78° C. and pressure of 0.3 bar was introduced into the steam supply region. In this case, whether a foam is generated inside the stripping apparatus was observed, and the result of the evaluation is shown in Table 1.

Example 4

A stripping process was performed in the same way as Example 1 except that steam at a temperature of 84° C. and pressure of 0.4 bar was introduced into the steam supply region. In this case, whether a foam is generated inside the stripping apparatus was observed, and the result of the evaluation is shown in Table 1.

Comparative Example 1

A stripping process was performed in the same way as Example 1 except that steam at a temperature of 100° C. and pressure of 1.0 bar was introduced into the steam supply region. In this case, whether a foam is generated inside the stripping apparatus was observed, and the result of the evaluation is shown in Table 1. In addition, a photograph of the inside of the stripping apparatus was taken and is shown in FIG. 3.

COMPARATIVE EXAMPLE 2

A stripping process was performed in the same way as Example 1 except that steam at a temperature of 127° C. and pressure of 1.5 bar was introduced into the steam supply region. In this case, whether a foam is generated inside the stripping apparatus was observed, and the result of the evaluation is shown in Table 1. In addition, a photograph of the inside of the stripping apparatus was taken and is shown in FIG. 4.

A temperature difference between an introduced raw material and steam in the examples and comparative examples is shown in Table 1.

TABLE 1

|  | Δ ($T_s - T_f$) (° C.) | Whether Foam is Generated |
|---|---|---|
| Example 1 | 26 | X |
| Example 2 | 21 | X |
| Example 3 | 13 | X |
| Example 4 | 19 | X |
| Comparative Example 1 | 35 | ○ |
| Comparative Example 2 | 62 | ○ |

$T_s$: Temperature of steam introduced into stripping column
$T_f$: Temperature of raw material introduced into stripping column As shown in examples 1 to 4, foams were hardly generated in the stripping apparatus of the present application in which a temperature difference between a raw material including an emulsion polymerization product of a VCM and fed steam was adjusted to be equal to or greater than 5° C. and less than 30° C. However, as shown in FIGS. 3 and 4, a great number of foams were produced when a temperature difference between the raw material and the steam was equal to or greater than 30° C.

The invention claimed is:

1. A method for removing an unreacted monomer, the method comprising:
    introducing a raw material comprising an emulsion polymerization product of a monomer into a raw material supply region of a stripping column;
    bringing the introduced raw material into contact with steam introduced into a steam supply region of the stripping column to separate an unreacted monomer from the raw material; and
    adjusting temperatures of the raw material and the steam introduced into the stripping column to satisfy Equation 1:

$$5° C. \leq T_s - T_f < 30° C.$$  [Equation 1]

wherein $T_s$ represents a temperature of the steam introduced into the stripping column, and $T_f$ represents a temperature of the raw material introduced into the stripping column.

2. The method according to claim 1, wherein the monomer is a VCM.

3. The method according to claim 2, wherein the raw material comprises PVC and an unreacted VCM, and the raw material introduced into the raw material supply region is brought into contact with steam introduced into a steam supply region of the stripping column to separate the unreacted VCM from the raw material.

4. The method according to claim 1, further comprising:
    decompressing low-pressure steam having a pressure in a range of 2.5 to 5.0 bar using a decompression device; and
    introducing the decompressed low-pressure steam into the steam supply region of the stripping column.

5. The method according to claim 1, wherein the steam supply region comprises a first outlet, and the method further comprises flowing out a stripped raw material through the first outlet.

6. The method according to claim 1, wherein the raw material supply region comprises a second outlet, and the method further comprises flowing out an outflow comprising an unreacted monomer separated from the raw material and the steam through the second outlet.

7. The method according to claim 6, further comprising condensing steam in the flow flowing out through the second outlet to separate the steam from a non-condensed unreacted monomer.

8. The method according to claim 7, further comprising recovering and reusing the unreacted monomer separated from the flow flowing out through the second outlet.

* * * * *